United States Patent
Kim et al.

(10) Patent No.: US 9,209,467 B2
(45) Date of Patent: Dec. 8, 2015

(54) HUMIDIFIER FOR FUEL CELL

(75) Inventors: Kyoung-Ju Kim, Yongin-si (KR);
Yong-Cheol Shin, Seoul (KR);
Moo-Seok Lee, Seoul (KR)

(73) Assignee: KOLON INDUSTRIES, INC.,
Gwacheon-si (KR)

( * ) Notice: Subject to any disclaimer, the term of this patent is extended or adjusted under 35 U.S.C. 154(b) by 0 days.

(21) Appl. No.: 13/814,839

(22) PCT Filed: Aug. 17, 2011

(86) PCT No.: PCT/KR2011/006021
§ 371 (c)(1),
(2), (4) Date: Feb. 7, 2013

(87) PCT Pub. No.: WO2012/023788
PCT Pub. Date: Feb. 23, 2012

(65) Prior Publication Data
US 2013/0137005 A1     May 30, 2013

(30) Foreign Application Priority Data

Aug. 17, 2010   (KR) .................. 10-2010-0079439

(51) Int. Cl.
*H01M 8/06*    (2006.01)
*H01M 8/04*    (2006.01)
(52) U.S. Cl.
CPC ...... *H01M 8/04149* (2013.01); *H01M 8/04141* (2013.01); *Y02E 60/50* (2013.01)
(58) Field of Classification Search
None
See application file for complete search history.

(56) References Cited

U.S. PATENT DOCUMENTS

| | | | |
|---|---|---|---|
| 2002/0039674 A1* | 4/2002 | Suzuki et al. | 429/30 |
| 2002/0150801 A1* | 10/2002 | Yang | 429/22 |
| 2003/0211374 A1* | 11/2003 | Dehne | 429/26 |
| 2006/0147774 A1* | 7/2006 | Suzuki et al. | 429/26 |
| 2007/0210463 A1* | 9/2007 | Koenig et al. | 261/100 |
| 2007/0246049 A1 | 10/2007 | Takeda et al. | |

(Continued)

FOREIGN PATENT DOCUMENTS

| | | |
|---|---|---|
| CN | 101238606 A | 8/2008 |
| CN | 101534934 A | 9/2009 |

(Continued)

OTHER PUBLICATIONS

Japan Patent Office, Communication dated Jan. 28, 2014, issued in corresponding Japanese application No. 2013-524058.

(Continued)

*Primary Examiner* — Patrick Ryan
*Assistant Examiner* — Jose Colucci Rios
(74) *Attorney, Agent, or Firm* — Sughrue Mion, PLLC

(57) ABSTRACT

Disclosed is a humidifier for a fuel cell having an enhanced humidifying performance and being able to prevent an instantaneous decrease of the output of a car which might occur at the time of high-speed driving. The humidifier comprises a membrane housing with first and second ends; a bundle of hollow fiber membranes provided in an inner space of the membrane housing; a humidity retainer provided in the inner space of the membrane housing; a first cover mounted on the first end of the membrane housing, the first cover including an inlet for introducing unreacted gas of high-humidity discharged from a stack; and a second cover mounted on the second end of the membrane housing, the second cover including an outlet for discharging the unreacted gas used for humidification.

8 Claims, 2 Drawing Sheets

(56) References Cited

U.S. PATENT DOCUMENTS

| | | | |
|---|---|---|---|
| 2008/0093752 A1* | 4/2008 | Jeon | 261/100 |
| 2009/0130495 A1 | 5/2009 | Terasaki et al. | |
| 2009/0208797 A1* | 8/2009 | Kim et al. | 429/26 |
| 2009/0226784 A1* | 9/2009 | Kim | 429/26 |
| 2010/0068603 A1 | 3/2010 | Kanazawa et al. | |
| 2011/0129740 A1* | 6/2011 | Koo | 429/413 |
| 2012/0094197 A1* | 4/2012 | Ko et al. | 429/414 |

FOREIGN PATENT DOCUMENTS

| | | | |
|---|---|---|---|
| JP | 2002075421 A | 3/2002 | |
| JP | 2004006389 A | 1/2004 | |
| JP | 2005-177387 A | 7/2005 | |
| JP | 2006147390 A | 6/2006 | |
| JP | 2007002099 A | 1/2007 | |
| JP | 2007095558 A | 4/2007 | |
| JP | 2007207610 A | 8/2007 | |
| JP | 2007323982 A | 12/2007 | |
| JP | 2008096074 A | 4/2008 | |
| JP | 2008-293742 A | 12/2008 | |
| JP | 2008-309371 A | 12/2008 | |
| JP | 2010107069 A | 5/2010 | |
| JP | 2010117094 A | 5/2010 | |
| KR | 10-0805467 B1 | 2/2008 | |

OTHER PUBLICATIONS

European Patent Office, Communication dated Jul. 25, 2014, issued in corresponding European Application No. 11818388.8.
State Intellectual Property Office of the People'S Republic of China, Communication dated Sep. 4, 2014, issued in corresponding Chinese Application No. 201180038893.3.

* cited by examiner

HUMIDIFIER FOR FUEL CELL

TECHNICAL FIELD

The present invention relates to a humidifier for a fuel cell, and more particularly, to a humidifier for a fuel cell having an enhanced humidifying performance.

BACKGROUND ART

A fuel cell is an electrochemical cell which generates electricity by combination of hydrogen and oxygen. Unlike a general chemical cell such as a dry cell or storage cell, the fuel cell can generate electricity continuously as long as the hydrogen and oxygen are supplied. In addition, little heat loss occurs in the fuel cell so that efficiency of the fuel cell is twice as high as efficiency of internal combustion engine. Furthermore, since the fuel cell directly converts chemical energy generated by the combination of hydrogen and oxygen into electric energy, the fuel cell is eco-friendly and capable of mitigating the concerns about the exhaustion of fossil fuel.

Depending on the type of electrolyte, the fuel cell may be classified into a polymer electrolyte fuel cell, a phosphoric acid fuel cell, a molten carbonate fuel cell, a solid oxide fuel cell, and a alkaline fuel cell.

One of the most important factors to improve the performance of the polymer electrolyte fuel cell is to maintain the amount of the humidity contained in the polymer electrolyte membrane of a membrane-electrode assembly by continuously supplying predetermined amount of moisture to the membrane. This is because the generating efficiency of the fuel cell is rapidly deteriorated as the polymer electrolyte membrane is dried.

Among the various methods for humidifying the polymer electrolyte membrane is a method using a polymer separation membrane for supplying the moisture to the dry reaction gas.

The membrane humidifying method uses a membrane which allows only the vapor contained in the exhaust gas to pass therethrough, to thereby supply the vapor to the polymer electrolyte membrane. This method is advantageous in that a humidifier of a small size and light weight can be manufactured.

As to the membrane for the membrane humidifying method, it is preferable to use a hollow fiber membrane(s) which can provide a large permeation area per unit volume when applied in a module. That is, when a humidifier is fabricated with the hollow fiber membranes, the hollow fiber membranes having a large contact surface area can be highly integrated so that the fuel cell is sufficiently humidified even with small volume. The hollow fiber membranes can be formed of a low-priced material. Also, moisture and heat contained in the unreacted gas discharged at a high temperature from the fuel cell can advantageously be collected and reused through the humidifier.

Typically, a humidifier for fuel cell comprises a membrane housing in which a bundle of hollow fiber membranes are integrated to supply the moisture to the reaction gas flowing through a hollow; an inlet for introducing unreacted gas of high humidity; and an outlet for discharging the gas.

However, the hollow fiber membrane used for the humidifier according to the related art can not contain the sufficient moisture due to the structural reason. Thus, if a gas inflow speed is raised in a moment due to a sudden acceleration while an automobile is driven, it is impossible to promptly humidifying the reaction gas. As a result, insufficiently-humidified gas is supplied to the fuel cell from the humidifier causing the instantaneous decrease in output of a fuel cell system.

In order to overcome this kind of problem, there has been proposed a method of increasing a thickness of the hollow fiber membrane so as to increase the humidity content in the hollow fiber membrane. However, the increased thickness of the hollow fiber membrane causes difficulties in moisture transfer so that it might cause adverse effect such as deterioration of humidifying performance.

DISCLOSURE

Technical Problem

An aspect of the present invention is to provide a humidifier for fuel cell having an enhanced humidifying performance and thus being able to prevent an instantaneous decrease of the output of a car which might occur at the time of high-speed driving.

Technical Solution

To achieve these objects and other advantages and in accordance with the purpose of the invention, as embodied and broadly described herein, there is provided a humidifier for fuel cell comprising: a membrane housing with first and second ends; a bundle of hollow fiber membranes provided in an inner space of the membrane housing, wherein both ends of the hollow fiber membrane are respectively potted into the first and second ends of the membrane housing; a humidity retainer provided in the inner space of the membrane housing; a first cover mounted on the first end of the membrane housing, the first cover including an inlet for introducing unreacted gas of high-humidity discharged from a stack; and a second cover mounted on the second end of the membrane housing, the second cover including an outlet for discharging the unreacted gas used for humidification.

Advantageous Effects

According to the present invention, the humidifier of a fuel cell includes a humidity retainer capable of containing a large amount of moisture. Thus, the sufficient amount of the moisture can be supplied to the fuel cell even when a car accelerates suddenly.

Also, the humidifier according to the present invention is provided with a division plate inside the membrane housing, whereby the unreacted gas of high-humidity can be uniformly supplied to the entire hollow fiber membranes inside the membrane housing.

BEST MODE

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Hereinafter, a humidifier for fuel cell according to the present invention will be described with reference to the accompanying drawings.

Figure 1:
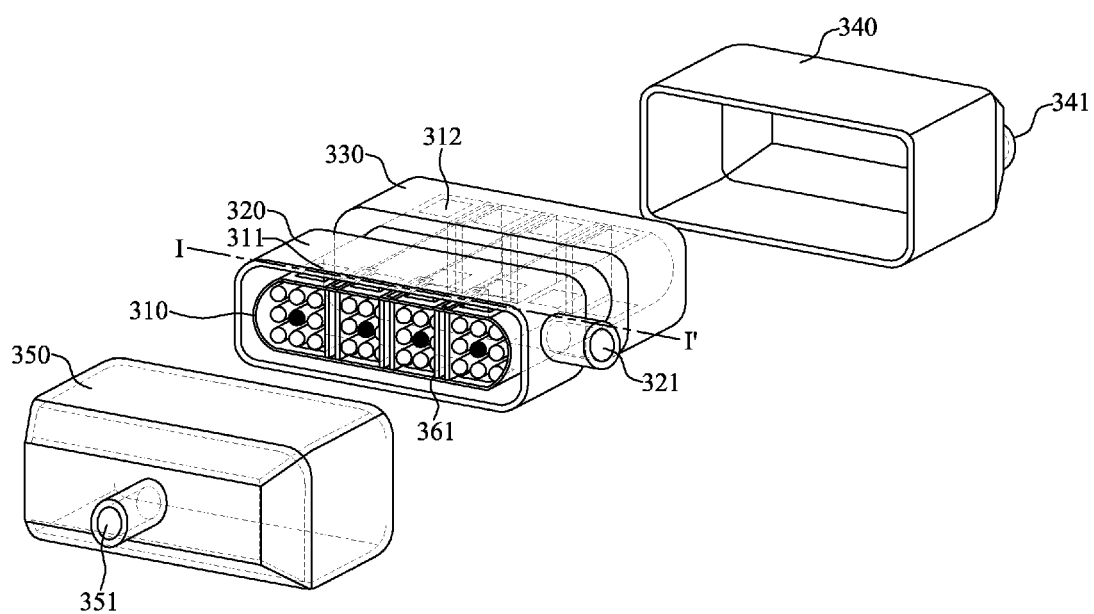
FIG. 1 is a schematic view illustrating a humidifier for the fuel cell according to one embodiment of the present invention.

FIG. 1 is a schematic view illustrating a humidifier for fuel cell according to one embodiment of the present invention.

As shown in FIG. 1, the humidifier for fuel cell according to the present invention includes a membrane housing 310 with the first and second ends. At the first end of the membrane housing 310, there are first holes 311. At the second end positioned opposite to the first end, there are second holes 312. The membrane housing 310 has an inner space.

The hollow fiber membranes 370 are integrated in the inner space of the membrane housing 310. Both ends of the hollow fiber membrane 370 are respectively potted into the first and second ends of the membrane housing 310. Both ends of the hollow fiber membrane 370 remain open so that a fluid outside the membrane housing 310 can be introduced into the hollow of the hollow fiber membrane 370, flow through the hollow, and then come out of the membrane 370.

For supplying the unreacted gas of high-humidity to the hollow fiber membranes 370 inside the membrane housing 310, a plurality of first holes 311 are formed in lower and upper portions of the first end of the membrane housing 310. After the moisture contained in the unreacted gas is supplied to the hollow fiber membranes 370, the unreacted gas which becomes dry is discharged to the outside the membrane housing 310 via the plural second holes 312 in lower and upper portions of the second end of the membrane housing 310.

When reaction gas to be supplied to the fuel cell flows through the hollow and the unreacted gas of high-humidity is supplied to the inner space of the membrane housing 310 via the first holes 311 of the membrane housing 310, the reaction gas and the unreacted gas of high-humidity is physically prevented from mixing with each other by the hollow fiber membrane 370. However, the moisture of the unreacted gas of high-humidity can pass through the hollow fiber membrane 370, whereby humidifying the reaction gas flowing through the hollow of the hollow fiber membrane 370.

The first end of the membrane housing 310 is covered with a first cover 320. The first cover 320 is provided with an inlet 321 for introducing the unreacted gas of high-humidity discharged from the stack to the inside of the humidifier. While the unreacted gas of high-humidity introduced via the inlet 321 flows outside the membrane housing 310, it flows into the inside of the membrane housing 310 via the first holes 311.

A sealing portion (not shown) is provided between an inner surface of the first cover 320 and the first end of the membrane housing 310, whereby the unreacted gas of high-humidity flows only into the inside of the membrane housing 310. That is, since the inlet 321 of the first cover 320 is in fluid communication only with the plural first holes 311, the unreacted gas of high-humidity introduced via the inlet 321 flows into the inside of the membrane housing 310 only via the plural first holes 311.

At the second end of the membrane housing 310 is provided a second cover 330 which includes an outlet (not shown) for discharging the unreacted gas used for the humidification and dried to the outside of the humidifier.

A sealing portion (not shown) is provided between the inner surface of the second cover 330 and the second end of the membrane housing 310, whereby the unreacted gas which becomes dry is discharged only via the outlet of the second cover 330.

A first cap 350 having a reaction gas outlet 351 is installed at the end of the first cover 320. The reaction gas humidified while flowing through the hollow of the hollow fiber membrane 370 is discharged to the outside of the humidifier via the reaction gas outlet 351, and then supplied to the fuel cell.

A second cap 340 having a reaction gas inlet 341 is installed at the end of the second cover 330. The dry reaction gas is introduced to the inside of the humidifier via the reaction gas inlet 341 before it is supplied to the fuel cell.

Figure 2:
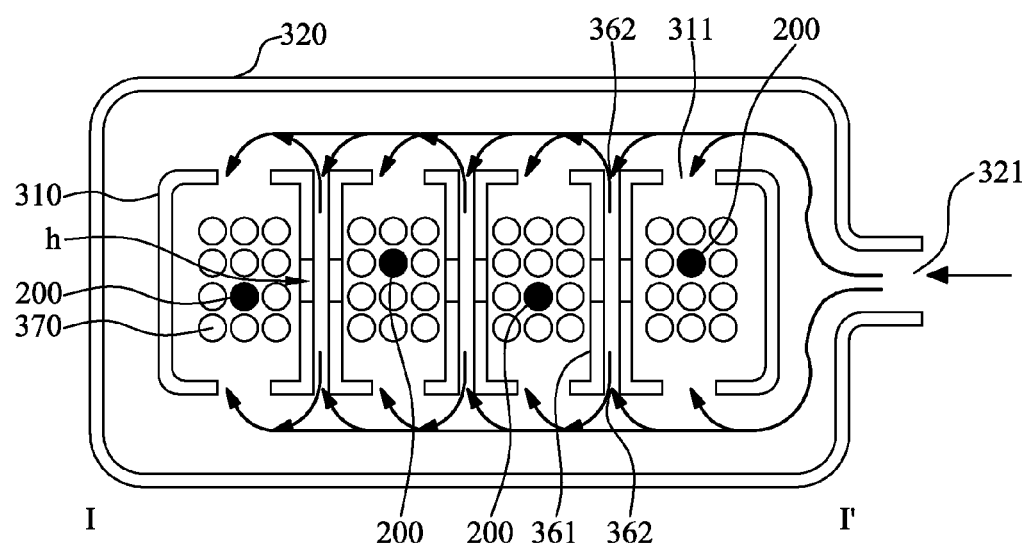
FIG. 2 is a sectional view along I-I' of FIG. 1.

FIG. 2 is a sectional view along I-I' of FIG. 1.

As shown in FIG. 2, the humidifier for a fuel cell according to the present invention includes a humidity retainer 200 disposed in the inner space of the membrane housing 310.

If the humidity content in the hollow fiber membrane 370 positioned adjacent to the humidity retainer 200 is suddenly lowered, the humidity retainer 200 retaining a large amount of moisture thereinside supplies its moisture to the hollow fiber membrane 370.

The hollow fiber membrane 370 used for the conventional humidifier cannot contain a sufficient amount of moisture due to the structural reason. Thus, if the inflow speed of the reaction gas is raised instantaneously due to a sudden acceleration while a fuel cell automobile is driven, it is impossible to promptly humidify the reaction gas. The reaction gas supplied to the fuel cell while insufficiently humidified causes an instantaneous decrease of the output of the fuel cell system.

In order to solve this problem, the humidity retainer 200 capable of containing a large amount of moisture is inserted into the space inside the membrane housing 310 so that a sufficient amount of moisture can be supplied to the reaction gas even though a large amount of reaction gas suddenly flows into the hollow of the hollow fiber membrane 370 at the time of a high speed driving.

The humidity retainer 200 may be inserted into the bundle of the hollow fiber membranes 370 integrated inside the membrane housing 310. That is, the humidity retainer 200 is inserted among the hollow fiber membranes 370. If the humidity content is suddenly lowered in the hollow fiber membrane 370 adjacent to the humidity retainer 200, the humidity retainer 200 supplies the moisture to the adjacent hollow fiber membrane 370. Since the humidity retainer 200 is inserted among the hollow fiber membranes 370, it is possible to supply the moisture to the hollow fiber membranes 370 in a short time.

Alternatively, the humidity retainer 200 may be disposed outside the bundle of the hollow fiber membranes 370 integrated inside the membrane housing 310. That is, if the humidity content in the bundle of the hollow fiber membranes 370 is suddenly lowered, the humidity retainer 200 disposed outside the bundle of the hollow fiber membranes 370 supplies the moisture to the bundle of the hollow fiber membranes 370. Since the humidity retainer 200 is disposed outside the bundle of the hollow fiber membranes 370, a large amount of moisture can be supplied to the bundle of the hollow fiber membranes 370 with easiness.

The humidity retainer 200 inserted among the hollow fibers 370 occupies 1~20% of the inner spatial volume of the membrane housing 310. If the volume occupied by the humidity retainer 200 is less than 1%, it is difficult to supply a sufficient amount of moisture to the hollow fiber membranes 370, thereby causing the decrease of the output of a car at time of a high speed driving. Meanwhile, if the volume occupied by the humidity retainer 200 is more than 20%, the membrane area effective for the humidification is too small to enhance the humidifying performance the humidifier.

The humidity retainer 200 may be prepared in various shapes. For example, the shape of the humidity retainer 200 may be one among sponge, hollow fiber membrane, fiber, woven fabric, knitted fabric, nonwoven fabric, and braid.

Especially, since the braid-type humidity retainer 200 is similar in shape to the hollow fiber membrane 370, it allows the enhanced degree of integration and maximizes the humidifying efficiency. In addition, a large surface area of the braid-type humidity retainer 200 makes it possible to contain a large amount of moisture, physically.

The humidity retainer 200 may be prepared of various materials. For example, the humidity retainer 200 may include a conducting material such as nafion, sulfonated polysulfone, sulfonated polyimide, and sulfonated polyaryleneether. The humidity retainer 200 including the conducting material has a hydrophilic group with a chemical affinity for moisture, whereby the humidity retainer 200 can contain a large amount of moisture thereinside.

Among the aforementioned conducting materials, nafion manufactured by DuPont has a drawback in that it is so expensive, although it allows rapid moisture transfer and has excellent gas barrier effect. Meanwhile, sulfonated polysulfone, sulfonated polyimide, and sulfonated polyaryleneether are reasonable in terms of price while they are similar to the nafion in terms of the performance.

Also, the humidity retainer 200 may have a shape capable of containing a large amount of moisture physically and may be formed of at least one of polyethylene and polypropylene. For example, a sponge-shaped or braid-shaped polyethylene having a plurality of pores physically can contain a large amount of moisture so that the moisture might be sufficiently supplied to the hollow fiber membrane 370 in a short time.

As shown in FIG. 2, the humidifier according to the present invention may further include a division plate which divides the inner space of the membrane housing 310 into plural unit spaces.

The division plate may have a dual partition structure. That is, the division plate includes two partitions 361. A slit 362 between the two partitions 361 penetrates both lower and upper sides of the membrane housing 310.

The dual partition structure may be formed in at least a portion of the division plate. For example, the dual partition structure may be applied to the portion of the division plate corresponding to at least one of the first and second ends of the membrane housing 310.

The slit 362 of the division plate may have a cross section which is formed in various shapes, for example, rectangle, circle, and etc.

A through hole (h) may be formed in the partition 361 of the division plate. Via the through hole (h) of the partition 361, the unreacted gas in the first unit space of the membrane housing 310 can flow into the second unit space of the membrane housing 310. Thus, the unreacted gas can be uniformly supplied to the entire inner space of the membrane housing 310. The through hole (h) may be formed in various shapes, for example, rectangle, circle, ellipse, slit, slant slit, mesh, and etc.

The division plate having the dual partition structure is advantageous in that fluid can flow via the slit 362 between the partitions 361. That is, the unreacted gas of high-humidity introduced via the inlet 321 of the first cover 320 can flow from the upper side of the membrane housing 310 to the lower side of the membrane housing 310 via the slit 362, or vice versa. As a result, the unreacted gas of high-humidity can be uniformly supplied to the plurality of unit spaces formed by the division plate. Also, if the unreacted gas of high-humidity excessively flows above the upper side of the membrane housing 310, the unreacted gas of high-humidity above the membrane housing 310 flows toward the lower side of the membrane housing 310 via the slit 362 of the partition 361, whereby the unreacted gas of high-humidity can be supplied to both lower and upper sides of the membrane housing 310 in substantially equal amount. Accordingly, the unreacted gas of high-humidity introduced via the inlet 321 of the first cover 320 can be uniformly distributed and used for humidification without being concentrated on a predetermined portion inside the membrane housing 310.

In order to prevent the unreacted gas from being concentrated in the predetermined portion inside the membrane housing 310, it is preferable for the division plate to divide the inner space of the membrane housing 310 into more unit spaces. From the viewpoint of the manufacturing difficulty and cost, it is preferable that the membrane housing 310 include 2~10 unit spaces.

An operation of the humidifier for fuel cell according to one embodiment of the present invention will be described in detail as follows.

The dry reaction gas to be supplied to the fuel cell flows into the humidifier via the reaction gas inlet 341 of the second cap 340, and simultaneously, the unreacted gas of high-humidity discharged from the stack flows into the humidifier via the inlet 321 of the first cover 320.

The dry reaction gas is supplied to the hollow of the hollow fiber membrane 370 via the open end of the hollow fiber membrane 370, and the unreacted gas of high-humidity is supplied to the inner space of the membrane housing 310 via the first holes 311. At this time, the unreacted gas of high-humidity is uniformly supplied to the entire unit spaces of the membrane housing 310 while freely flowing from the upper side to the lower side of the membrane housing 310 via the slit 362 between the partitions 361, or vice versa.

The unreacted gas of high-humidity containing a large amount of moisture, introduced into the inner space of the membrane housing 310, contacts with the hollow fiber membranes 370 and the humidity retainer 200, and supplies the moisture to the hollow fiber membranes 370 and the humidity retainer 200.

Thus, the hollow fiber membrane 370 is supplied with the moisture. Then, the hollow fiber membrane 370 supplies the moisture to the dry reaction gas flowing through the hollow of the hollow fiber membrane 370 by the difference of moisture density. The humidified reaction gas is supplied to the fuel cell via the reaction gas outlet 331 of the first cap 330

If a large amount of reaction gas suddenly is introduced into the humidifier via the reaction gas inlet 341 of the second cap 340 at the time of a high speed driving, a large amount of moisture is transferred from the hollow fiber membrane 370 to the reaction gas in a short time. In this case, the humidity retainer 200 promptly supplies the moisture to the low-humidity hollow fiber membrane 370 such that the hollow fiber membrane 370 can continuously supply a sufficient amount of moisture to the reaction gas, thereby preventing the decrease of the output of a car at the time of a high speed driving.

What is claimed is:

1. A humidifier for fuel cell comprising:
   a membrane housing provided with first and second ends;
   a bundle of hollow fiber membranes provided in an inner space of the membrane housing, wherein both ends of the hollow fiber membranes are respectively potted into the first and second ends of the membrane housing;
   a humidity retainer;
   a first cover mounted on the first end of the membrane housing, the first cover including an inlet for introducing a first gas of high-humidity into the inner space of the membrane housing; and a second cover mounted on the second end of the membrane housing, the second cover including an outlet for discharging the first gas used for humidification, from the inner space of the membrane housing, wherein the humidity retainer is formed of at least one of polyethylene and polypropylene and has a form capable of containing a large amount of moisture therein, the form being selected from the group consisting of sponge and braid, and wherein the humidity retainer of the sponge or braid form is disposed adjacent to the hollow fiber membranes in the inner space of the membrane housing such that the humidity retainer can increase humidity of a second gas flowing through inside the hollow fiber membranes.

2. The humidifier for fuel cell according to claim 1, wherein the humidity retainer is disposed within the bundle of the hollow fiber membranes.

3. The humidifier for fuel cell according to claim 1, wherein the humidity retainer is disposed outside the bundle of the hollow fiber membranes.

4. The humidifier for fuel cell according to claim 1, wherein the humidity retainer occupies 1-20% of inner spatial volume of the membrane housing.

5. The humidifier for fuel cell according to claim 1, further comprising a division plate which divides the inner space of the membrane housing into a plurality of unit spaces.

6. The humidifier for fuel cell according to claim 5, wherein the division plate has a dual partition structure.

7. The humidifier for fuel cell according to claim 6, wherein the division plate includes two partitions, and a slit between the two partitions penetrates both lower and upper sides of the membrane housing.

8. The humidifier for fuel cell according to claim 7, wherein each of the partitions has a through hole.

* * * * *